United States Patent Office 3,280,646
Patented Oct. 25, 1966

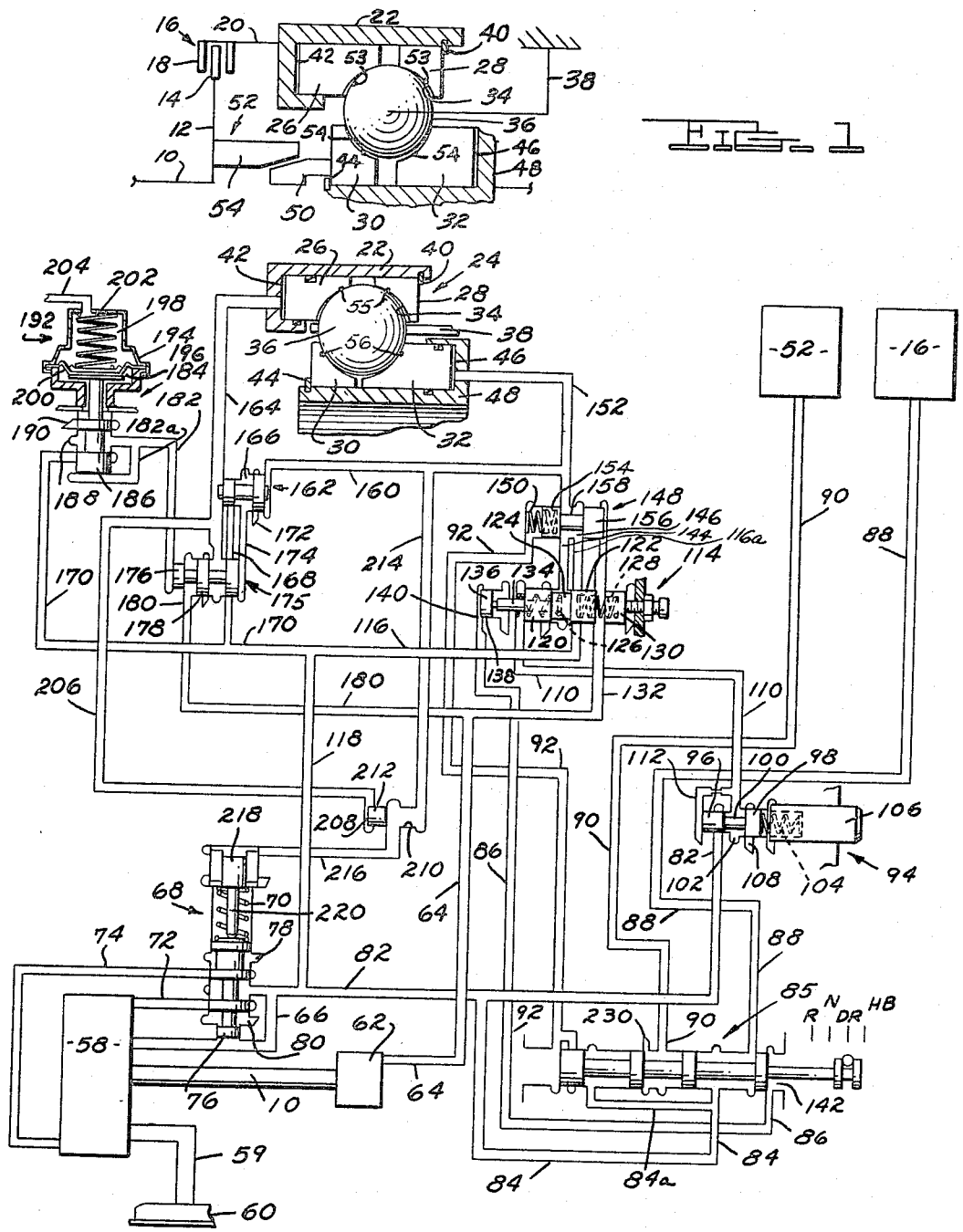

3,280,646
CONTROL SYSTEM FOR AN INFINITELY
VARIABLE SPEED FRICTION DRIVE
George E. Lemieux, Dearborn Heights, Mich., assignor to Ford Motor Company, Dearborn, Mich., a corporation of Delaware
Continuation of application Ser. No. 334,431, Dec. 30, 1963. This application Feb. 2, 1966, Ser. No. 533,752
43 Claims. (Cl. 74—200)

This invention relates to an infinitely variable speed friction drive transmission. More particularly, it relates to a fluid pressure control system for such a friction drive.

One of the objects of the invention is to provide a fluid pressure control system for a friction drive, which in this case is a ball drive unit, that will automatically vary the drive ratio in infinite increments between a minimum and maximum, and at the same time provide proper modulation of the clamping pressure forces.

It is another object of the invention to provide a friction drive control system having means responsive to changes in engine torque and speed, and ball drive ratio, for automatically modulating the clamping pressure to the proper value for the ball drive ratio established.

A further object of the invention is to provide a ball drive fluid pressure control system with valving differentially movable in response to changes in engine intake manifold vacuum, engine governor pressure, and ball drive ratio pressure to automatically modulate the clamping pressure in inverse proportion to the drive ratio pressure change, and to the proper value for each drive ratio established.

Other objects, features, and advantages of the invention will become apparent upon reference to the succeeding, detailed description thereof, and to the drawings illustrating the preferred embodiment thereof; wherein, FIGURE 1 shows, schemtically, a cross section of a ball drive unit; and, FIGURE 2 shows, schematically, a fluid pressure control system for the ball drive of FIGURE 1.

FIGURE 1 shows a power input shaft 10, which may be driven by any suitable source of power, such as, for example, the internal combustion engine for a motor vehicle. Shaft 10 is connected by a flange 12 to the driving friction disc member 14 of a clutch 16. The clutch is of the fluid pressure actuated, spring-released type, and has a driven portion including similar friction discs 18 splined to a drum portion 20. The drum portion is fixed to an annular cover 22 for the outer race of a friction drive device 24.

The friction device includes spaced outer race portions 26 and 28, and inner race portions 30 and 32. The portions have concave complementary surfaces defining an annular raceway 34 receiving balls 36 frictionally engaged with the races. The balls are mounted for a radial rolling movement in a stationary reaction carrier 38. The outer race portions 26 and 28 are splined to cover 22, and axially slidably spaced from each other. The portion 28 is located axially against a snap ring 40. Portion 26 is sealingly and slidably located within a cylindrical recess 42 defined by an extension of cover 22. The recess and movable race portion 26 become, in effect, a servo having a piston 26 movable by fluid under pressure within the cylindrical extension of cover 22.

The inner race portions 30 and 32 are mounted in a similar manner, race portion 30 being axially located against a snap ring 44, and together with portion 32, being splined to a cover 48. Portion 32 is sealingly and axially slidably mounted in a cylindrical chamber 46 in cover 48 to establish the race portion as the piston of a fluid pressure operated servo.

The driven portion 50 of a fluid pressure actuated, spring-released type cone clutch 52 is fixed to inner race portion 30. This clutch portion is adapted to cooperate with a drive cone clutch portion 54 secured to flange 12 to provide a Reverse drive, when engaged, as will be described.

Inner race portion 32 is moved axially to establish a particular drive ratio by radially moving ball 36 to separate the outer race portions, or permit them to move together, as the case may be. To provide a maximum underdrive of the inner race with respect to the outer race, race 32 would be moved towards race 30 so that ball 36 contacts the races at points 53 and 54, as shown in FIGURE 2. By progressively spreading the inner race portions in the FIGURE 2 showing, the drive is changed to a direct drive, as shown in FIGURE 1 and then to an overdrive, indicated in FIGURE 1, with contact at points 55 and 56.

If the inner race is used to control change in drive ratio, the outer race portion 26 is used to provide the proper clamping forces on the elements to maintain a drive through the device at all times. It will be clear, however, that the forces on both the inner and outer race elements must work together. That is, as will appear more clearly later, the clamping pressure is regulated such that it is sufficient to transmit a drive through the device, and yet, varies upon change in the drive ratio pressure, to permit movement of the outer race portion 26 to effffect a change in the drive ratio.

In operation, as far as has been described, Neutral, or No-drive condition, is established by disengaging both clutches 16 and 52. A Forward drive is established by engaging clutch 16. Rotation of shaft 10 in a clockwise direction drives the outer race in a clockwise direction to rotate ball 36 in the same direction about the stationary carrier 38, and rotate the inner race in the opposite direction. A Reverse drive is provided by disengaging clutch 16, and engaging cone clutch 52, which causes the friction drive to be bypassed. The inner race is, therefore, driven in the same direction, and at the same speed as input shaft 10.

The fluid pressure control system for this device is shown in FIGURE 2. It includes a known type of variable displacement main fluid pressure supply pump 58 driven by an engine output shaft 10, and having an intake line 59 connected to a sump 60. The discharge of fluid from pump 58 into a line 66 is controlled by a fluid pressure regulator valve 68. This valve is of the spool type, and is biased initially to a down position by a spring 70 to connect flow in line 66 to a line 72. Line 72 leads to the mechanism 58 for increasing the pump displacement to a maximum. A further line 74, also controlled by valve 68, leads to the mechanism 58 for decreasing the pump displacement, when necessary. The pressure in line 66 acting on the end land 76 of the regulator valve opposes the spring force, and, when sufficient to overcome the force of spring 70, causes the valve to regulate between the pump displacement ports and exhaust ports 78 and 80. The valve will then, in the absence of other forces, maintain a constant pressure in line 66, determined by the force of the spring.

The engine shaft 10 also drives a fluid pressure type governor 62, which provides a fluid passage signal in line 64 that changes from a minimum to a maximum substantially as the square of the change in engine speed.

The pressure in line 66, which is commonly known as line or system pressure, is distributed by a main supply line 82, and a branch line 84, to a manual valve 85. This valve is adapted to be moved manually by the vehicle operator, and moves to a plurality of positions; namely, Reverse (R), Neutral (N), Automatic Forward Drive (Dr), and Hill Brake or Low forward speed drive (Hb). The various movements of the manual valve selectively connects the fluid under pressure from line 84 and a branch 84a to other lines 86, 88, 90 and 92. The valve is shown in its forward drive, or Dr position, and, therefore, connects fluid at line pressure through line 88 directly to the servo of forward drive clutch 16.

The fluid in line 82 is also connected to a throttle valve unit 94. This unit comprises a spool valve having spaced lands 96 and 98 of different areas. The lands are connected by a reduced diameter neck portion 100, the space between defining a fluid pressure chamber 102. The valve is moved to the left by a spring 104 between land 98 and an actuator 106. The actuator is adapted to be connected, through suitable linkage, not shown, to the accelerator pedal for the motor vehicle. Movement of the accelerator pedal to open the carburetor throttle connects chamber 102 to the line pressure in line 82. Chamber 102 is connected to an outlet line 110 having a branch 112 directing fluid against the rear face of land 96. This force, plus the force acting against the larger area of land 98, moves the valve to the right against the spring force in an attempt to connect chamber 102 to an exhaust line 108.

In operation, depression of the accelerator pedal moves element 106 to act through the spring 104 and move the throttle valve to the left. This cracks open line 82 to lines 110 and 112 until the pressure against land 96 builds up enough to move the valve to the right far enough to close line 82. The valve then regulates back and forth, providing a constant regulated pressure in line 110 for the particular degree of opening movement of the accelerator pedal. The pressure, of course, will vary with changes in accelerator pedal position. It will be seen, therefore, that the throttle valve provides a throttle or TV pressure in line 110 that varies from zero or a minimum to a maximum substantially in direct proportion to the degree of opening movement of the accelerator pedal, and therefore serves as a good indication of engine torque demand.

The TV pressure in line 110 is directed to one end of a ball ratio control valve 114. This valve is a fluid pressure regulating valve, and regulates the admission of fluid under pressure from a line 116 to a line 144. Line 116 is connected via a line 118 to main supply line 82. The valve 114 has spaced lands 120 and 122 connected by a reduced diameter neck portion to define a fluid chamber 124. Both lands 120 and 122 are internally bored to receive the ends of springs 126 and 128. Spring 126 is seated at its opposite end against the valve bore, as shown, and biases valve 114 to the right to connect chamber 124 to the fluid in inlet line 116. Spring 128 is seated at its opposite end in the bore of a stationary sleeve 130, which is adjustably mounted on the valve body for initially positioning valve 114.

The adjacent edges of the land 122 and sleeve 130 are chamfered so that engine governor pressure in a line 132 between the two can act on land 122 and urge it in a leftward direction. Line 132 is connected to line 64. The spring bore of valve land 120 also slidably receives the stem 134 of a piston 136 movable in a valve bore 138. Fluid under pressure from line 86 may act on the piston 136 to move it to the right when line 86 is connected to the fluid supply via a port 142 in the manual valve bore.

The fluid pressure modulated by the ratio control valve 114 is discharged through the line 144 to a line 152 leading to the servo for moving inner race portion 32. In doing so, the fluid passes through the line 146 of an engine idle ratio control valve 148. This valve is a spool type, having spaced connected lands 154 and 156 defining a fluid pressure chamber 158. The valve is biased to the idle position shown by a spring 150, and, at times, is additionally biased to this position by fluid at line pressure in line 92. This position connects chamber 158 directly to fluid at line pressure in a line 116a.

The valve 148 is moved to the left by governor pressure in line 132 acting on the right end of the valve, to cut off line 116a, and supply line 152 only from line 144. Thus, at engine idle speeds, the ball drive is always conditioned for a maximum underdrive, by the valve 148 directing line pressure from line 116a to line 152 and servo recess 46. When the engine speed increases above idle, the increase in governor pressure in line 132 immediately moves the valve 148 to the left to cut off line 116a, so that the pressure in line 152 then is determined solely by the ratio control valve 114.

The modulated line pressure in chamber 146 is also directed through a line 160 to one end of a ratio sensing spool valve 162. This valve is also a regulating valve, and has spaced lands of different areas. The left end of the valve is subjected to the force of fluid under pressure in a line 164 leading to the clamping pressure race servo recess 42. The valve has an exhaust port 172, and regulates the admission of fluid under pressure to the chamber 166, between the valve lands, from a line 168 connected through branches 170 and 118 to the main pressure line 82. The pressure in chamber 166, therefore, varies between zero, or a minimum, and a maximum equal to or lower than the line pressure in line 168, determined by the differential between the clamping pressure forces in line 164 and the drive ratio pressure forces in line 160. The resultant modulated or metered fluid pressure in chamber 166 passes through a line 174 to act on the end of a clamping pressure control valve 175.

Valve 175 is also a pressure regulating valve, and regulates the flow of fluid under pressure from line 168 into the clamping pressure line 164. The fluid pressure in line 174 varies as a function of the increase in ratio pressure in line 152 and 160; this increase is transmitted to valve 175 to attempt to close line 168 and thereby decrease the clamping pressure in line 164. Valve 175 has differential area lands 176 and 178, the adjacent faces of which are acted upon by governor pressure in line 180, connected to line 64, to move the valve to the right and increase clamping pressure with an increase in engine speed.

The valve clamping pressure control valve is also movable in response to changes in engine torque as evidenced by changes in engine intake manifold vacuum. That is, land 176 is acted upon by fluid pressure in a line 182 controlled by a vacuum modulator valve 184. This valve is a regulating spool type, movable within a bore 186 to selectively connect a fluid chamber 188 between valve lands to a main fluid pressure line 170, or to an exhaust line 190. A branch 182a connects the fluid under pressure to the back of land 186 to move it upwardly.

Valve 184 is adapted to provide a regulated source of fluid under pressure that varies from zero or a selected minimum to a maximum equal to or below line pressure, in accordance with changes in engine intake manifold vacuum. For this purpose, a vacuum servo 192 is shown having a casing 194 divided by a flexible diaphragm 200 into an atmosphere air chamber 196 and a vacuum chamber 198. The diaphragm is fixed to one end of the valve 184, and a spring 202 normally biases the valve to open wide the inlet line 170 to chamber 188. The vacuum chamber 198 is connected through a line 204 to the vacuum in the intake manifold of the vehicle, not shown, that drives shaft 10. The mechanism is normally calibrated so that at full vacuum, representing closed condition of the engine throttle valve and accelerator pedal, inlet line 170 will be blocked, and no pressure will exist in line 182. Conversely, full depression of the accelerator pedal, corresponding to minimum vacuum in line 204, will permit the spring 202 to position the diaphragm 200 to open wide the inlet 170, and therefore provide fluid at line pressure in line 182.

The clamping pressure line 164 has a branch 206 leading to one end 208 of a bore 210 containing a movable shuttle valve 212. The opposite end of the bore is connected by a branch line 214 to lines 160 and 152 containing the regulated ratio pressure fluid. The shuttle valve is moved to the ends of the bore by the higher of the two pressures in lines 206 or 214 to connect that higher pressure line to a central passage 216. Passage 216 is connected to the top of a plug 218 associated with the pressure regulator valve 68. This pressure, acting through a stem 220, aids the force of spring 70, and boosts the line pressure in line 82 to a value providing the correct ratio and clamping pressures, according to operating conditions.

It will be seen, therefore, that a change in the pressure in ratio line 152, will cause a simultaneous change in the clamping pressure in 164 in inverse proportion. With an increase in engine speed, and changes in accelerator pedal position, the drive will progress automatically from its maximum underdrive to an overdrive, in which case, the outer race portions 26 and 28 will be moved together by an increasing pressure in line 164, the separation of the inner race portions 30 and 32 by ball 36 being permitted by the simultaneously decreasing pressure in line 152.

In the position shown in FIGURE 2, the ball drive device 24 is conditioned for its maximum underdrive, with the movement of the inner race portions 30 and 32 to positions closely adjacent one another having caused the ball 36 to separate the outer race elements 26 and 28 the greatest extent. During this condition, the transmission will provide the greatest torque multiplication. Therefore, the ratio pressure need be high to maintain the elements in this position due to the initial high torque load. The clamping pressure will vary in inverse proportion; that is, it will be lower to permit the axial separation of the outer race portions to their greatest extent, while at the same time provide sufficient clamping pressure to transmit a drive through the device.

In over-all operation, the control system is shown with the manual valve 85 positioned for an automatic forward speed drive range Dr. Forward or clockwise rotation of the input shaft 10 discharges fluid from pump 58 into the main fluid pressure line 82. The discharged fluid initially is regulated by regulator valve 68 according to the force of spring 70. The line pressure in line 82 is delivered through the manual valve supply line 84 and the manual valve 85 to the forward clutch supply line 88, applying forward clutch 16. At the same time, line pressure is distributed from line 82 to lines 118 and 116 and 116a to the ratio control valve 114 and the idle ratio control valve 148; to line 170 and 168 to the ratio sensing valve 162 and clamping pressure control valve 175; to line 170 to the vacuum modulator valve 184; as well as through line 82 to the throttle control valve 94. The line 90, leading to the Reverse clutch 52, is vented through an exhaust port 230 in the manual valve, and lines 92 and 86 are vented out the open ends of the manual valve bore to the sump.

With the engine at idle condition, governor pressure in lines 64 and 132 is low, and spring 150 moves the idle ratio control valve 114 to the position shown. Accordingly, line pressure in line 116a is connected directly to line 152 and 160 and 214 to maintain the inner race portion 32 in the maximum underdrive position shown in FIGURE 2, or move it to that position, if not already there. Simultaneously, the governor pressure in line 180 acts against the clamping pressure control valve 175. However, initially, the high pressure in line 160 has moved valve 162 to supply high pressure to line 174 to move valve 175 to close the connection between lines 168 and 164. The governor pressure may or may not be sufficient at this time to provide a low pressure in line 164, depending upon the choice of the areas of the lands of valves 162 and 176. If not, no pressure will exist in line 164, and at engine idle, the ball drive will be in neutral, the elements merely slipping relative to each other. If the pressure is sufficient, a low pressure will exist in line 164 that is at the proper value to provide a forward maximum reduction drive.

At this engine idle condition, little or no pressure exists in line 182 from the vacuum modulator valve, since the accelerator pedal is released and engine vacuum is high, maintaining valve 184 closed, or substantially so. Also, the throttle valve 94 is closed; thus, no pressure exists in line 110. The ratio control valve 114 is, therefore, positioned as shown, by spring 126 and governor pressure in line 132. The shuttle valve 212 has moved to the left under the high ratio pressure in line 214, to act on the pressure regulator plug 218 to boost the mainline pressure in line 82.

Depression of the vehicle accelerator pedal causes many things to happen simultaneously. The immediate speed up of the engine shaft 10 causes the governor pressure in lines 64, 132 and 180 to increase. The idle ratio control valve 148, therefore, immediately is moved to the left against the force of spring 150, and closes the connection between the line pressure in line 116a and the ratio pressure line 152, so that line 152 must receive its supply from line 144 alone. The throttle valve 94 also opens to deliver a fluid pressure of a value proportionate to the degree of accelerator pedal movement to line 110 to act against the ratio control valve 114. The valve is then moved by the differential between this force and the rising governor pressure in line 132 to admit a modulated line pressure to the ratio pressure lines 144 and 152. Initially, with substantially full depression of the accelerator pedal, corresponding to the greatest engine torque demand, the valve 114 will be moved by TV pressure in line 110 far enough to the right to open wide line 116a to lines 114 and 152, and, therefore, positively condition the ball drive for its maximum underdrive.

Simultaneously, the depression of the accelerator pedal decreases the vacuum in line 204 to admit fluid at line pressure from line 170 to line 182 to act on the left end of clamping pressure control valve 175. This aids the increasing governor pressure in line 180 to balance or overcome the pressure in line 174, and provide the proper low pressure in line 164.

Thus, at this time, the clamping pressure control valve 175 is sensitive to: input shaft torque, by the high pressure in vacuum modulated line 182; input speed, by the increasing governor pressure in line 180; and the ratio of the ball drive, as indicated by the pressure in line 174, which is indicative of the differential between the ratio and clamping pressures.

As the engine speed increases, the governor pressure in line 132 will increase to move the ratio control valve 114 progressively to the left, and progressively decrease the modulated pressure in lines 152 and 160. Simultaneously, the increasing governor pressure in line 180, coupled with the decreasing pressure in line 182 (due to the increase in vacuum with increase in engine speed and less torque load), and the decrease in the ratio pressure in line 174, causes the control valve 175 to move further to the right and to provide a higher clamping pressure in line 164. Thus, as the ratio pressure decreases with an increase in engine speed and decrease in torque load, the clamping pressure in servo 46 will increase to move the ball 36 inwardly to separate the inner race portions 30 and 32, and thus vary the drive ratio towards a direct drive.

Upon continued progressive increase in engine speed, the ratio control valve 114 will continue to decrease progressively the ratio pressure in line 152, and effect a progressive increase in the clamping pressure in line 164 by movement of valve 175, until the ball drive is moved to its extreme overdrive position; at this point, the clamping pressure is at a maximum, and the ratio pressure at a minimum.

At any time during this progressive variation of drive ratio, the accelerator pedal can be moved to other positions, which will cause a corresponding change in the ratio and clamping pressures in line 152 and 164, since both the ratio control valve 114 and the clamping pressure control valve 175 are sensitive to changes in input shaft torque and engine speed.

The shuttle valve 212 will move from one position to the other, depending upon which pressure is greatest at the time, to always maintain the pressure regulator valve 68 operating to provide a mainline pressure meeting the requirements.

A Neutral range of operation of the transmission is provided by moving the selector valve 85 to the N position. This connects the forward clutch line 88 to an exhaust port 142 in the manual valve, and fills line 92 with fluid at line pressure to position the idle control valve 148 in the position shown. This automatically conditions the ball drive for its maximum underdrive ratio by supplying line 152 with line pressure from line 116a. The forward clutch 16, however, is disengaged, so that no drive is transmitted from the input shaft 10 to the ball drive outer race.

A Hill Brake of positive Low speed forward reduction drive is established by moving the selector valve to the position indicated by Hb. The forward clutch 16 becomes engaged, and line pressure is supplied to line 86. This moves piston 136 to the right and positions the ratio control valve 114 to open wide the line pressure line 116. Fluid at line pressure is therefore supplied to lines 144 and 152, and the ball drive is conditioned for its maximum underdrive for so long as the manual valve is in this position.

A Reverse drive is established by moving the manual selector valve 85 to the R position. At this time, forward clutch line 88 is vented, and lines 90 and 92 are filled with fluid at line pressure. The idle ratio control valve 148 thus is moved to its idle position shown to maintain the pressure in line 152 equal to that in line 116a, and maintain the ball drive conditioned for its maximum underdrive. The reverse clutch 52 being engaged, the input shaft 10 is connected directly to the inner ball race, and the ball drive is thereby bypassed.

From the foregoing, it will be seen that the clamping pressure is varied automatically according to the operating conditions of the transmission. That is, the clamping pressure control valve 175 is sensitive to changes in engine input torque and engine speed and the drive ratio change pressure. Therefore, if the accelerator pedal, or throttle control, is depressed or released to change engine torque demand, the engine speed changes, the engine intake manifold vacuum changes, and the engine throttle pressure changes, resulting in a change in both the ratio and clamping pressures in inverse proportion to each other to suit the particular conditions called for.

While the invention has been illustrated in its preferred embodiment, it will be clear to those skilled in the arts to which the invention pertains that many changes and modifications may be made thereto without departing from the scope of the invention.

I claim:

1. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radially move said rolling element and effect a change in the drive ratio of said transmission, including, in combination, fluid pressure servo means associated with each of said races for clamping said elements together for transmitting a drive through said transmission, a source of fluid under pressure, conduit means connecting said source and each of said servo means, and fluid pressure control means in said conduit means movable to vary the level of the fluid pressure directed to each of said servo means upon a change in the fluid pressure to one of said servo means.

2. A friction drive and control therefor, including a combination, an engine having a power output shaft, a pair of radially spaced friction drive races, and a radially movable rolling element therebetween, each of said races having axially spaced connected race elements frictionally engaging said rolling element, means connecting said output shaft and one of said elements, fluid pressure servo means clamping said elements together for a drive thereof, a fluid pressure source, conduit means connecting said source and said servo means, movable fluid pressure regulating control means in said conduit means for modulating the flow of fluid to said servo means, and fluid pressure means responsive to changes in the torque output of said engine for controlling said control means to modulate the clamping forces acting on said races as a function of the change in torque output of said engine.

3. In a control circuit for a friction drive transmission having a pair of radially spaced races at least one of which is rotatable relative to the other of said races, said races enclosing a radially adjustable rolling element frictionally engaged therebetween, each of said races having axially spaced and connected elements slidable towards or away from each other to radially move said rolling element and effect a change in the drive ratio of said transmission, fluid pressure servo means associated with each of said races for clamping said elements together for transmitting a drive through said transmission, a source of fluid under pressure, conduit means connecting said source and each of said servo means, fluid pressure control means in said conduit means movable to vary the level of the fluid pressure directed to each of said servo means in inverse proportion upon a change in the fluid pressure to one of said servo means, and means responsive to a change in the speed of rotation of one of said races for controlling said control means to effect a change in the clamping pressure acting on said servo means and drive ratio through said transmission.

4. A friction drive and control therefor, including in combination, an engine having a power output shaft, a pair of radially spaced friction drive races, and a radially movable rolling element therebetween, each of said races consisting of axially spaced connected race elements frictionally engaging said rolling element, means connecting said output shaft and one of said elements, fluid pressure servo means clamping said elements together for a drive therebetween, a fluid pressure source, conduit means connecting said source and said servo means, movable fluid control means in said conduit means varying the fluid pressure level to each servo means in inverse proportion to each other upon a change in the fluid pressure acting on one servo means, to effect a change in the drive ratio and clamping pressures between said elements by radial movement of said rolling element, and means responsive to changes in the torque output and speed of said engine for variably controlling said control means to variably change the clamping pressure and drive ratio through said friction drive.

5. In a control circuit for a ball drive transmission having a pair of radially spaced races at least one of which is rotatable relative to the other of said races, said races enclosing radially adjustable balls frictionally engaged therebetween, each of said races having axially spaced and connected elements slidable towards or away from each other for radially moving said balls and effecting a change in the drive ratio of said transmission, first fluid pressure servo means associated with one of said races for clamping said elements together to transmit a drive through said transmission, second servo means acting on said other race portions for changing the drive ratio, a source of fluid under pressure, conduit means connecting said source to each of said servo means, fluid pressure control means in said conduit means for regulating the level of the fluid pressure directed to one of said servo means in inverse proportion to the change in the fluid pressure to the other of said servo means, and means responsive to a change in the speed of rotation of one of said races for controlling said control means to effect a change in the clamping pressure on said races upon a change in the drive ratio through said transmission.

6. In a control circuit for a ball drive transmission having radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, and first and second fluid pressure control means in said conduit means for regulating the levels of the fluid pressure directed to said first and second servo means to control the drive ratio and clamping pressures, respectively, said second control means being movable in response to a change in said first servo means pressure for effecting a change in said second servo means pressure in inverse proportion, and means responsive to a change in the speed of rotation of one of said races for controlling said control means to effect a change in the drive ratio and clamping pressures on said servo means.

7. A control circuit for a friction drive transmission having radially spaced relatively rotatable races enclosing a radially adjustable rolling element frictionally engaged therebetween, each of said races having axially spaced and connected elements slidable towards or away from each other to radially move said rolling element and effect a change in the drive ratio of said transmission, including, in combination, fluid pressure servo means associated with each of said races for clamping said elements together for transmitting a drive through said transmission, a source of fluid under pressure, conduit means connecting said source and each of said servo means, and fluid pressure control means in said conduit means movable to vary the level of the fluid pressure directed to each of said servo means in inverse proportion upon a change in the fluid pressure thereto to one of said servo means.

8. A control circuit as in claim 7, wherein said control means includes a fluid pressure regulating valve movable variably across said conduit means between positions opening and closing said conduit means to provide a modulated fluid under pressure in said conduit means, means biasing said valve to a non-regulating position, a second source of fluid under pressure varying from a minimum to a maximum as a function of the changes in torque demand on an engine, and means connecting the fluid from said second source to said regulating valve to act thereon and bias said valve towards an open conduit means fluid regulating position with a force varying in proportion to the pressure of said second source fluid.

9. A control circuit as in claim 8, wherein said control means includes a further source of fluid varying in pressure as a function of the changes in speed of an engine operably drive connected to one of said races, and means connecting the fluid from said further source to said valve to act thereon in opposition to said second fluid pressure and bias said valve towards a closed conduit means position whereby the fluid pressure in said conduit means beyond said valve is modulated as function of the differential in fluid forces effected by changes in engine speed and engine torque demand.

10. A control circuit as in claim 9, wherein said further source of fluid under varying pressure comprises an engine driven fluid pressure governor providing a source of fluid under pressure that varies the increases in proportion to increases in engine speed.

11. A control circuit as in claim 9, wherein said conduit means includes a fluid bypass portion bypassing said regulating valve thereby connecting the fluid from said first named source directly to one of said servo means, and idle speed valve means extending across both said bypass portion and a second portion of said conduit means that contains fluid modulated by said regulating valve for controlling the flow of fluid therethough, said idle speed valve means being movable from a first position unblocking flow through both said second and bypass portions towards a second position blocking said bypass portion, means biasing said idle speed valve means to its first position, and means connecting the fluid from said further source to said idle speed valve means to act thereon in a direction moving it towards its second position with a force varying as a function of the changes in engine speed.

12. A control circuit as in claim 8, wherein said second source of fluid includes a regulating valve in a branch of said conduit means and variably movable across said branch conduit means from a position closing it to a position opening it, and means responsive to the torque demand on said engine for moving said latter valve.

13. A control circuit as in claim 12, wherein said means for moving said latter regulating valve includes means operably connecting said latter valve to the depressible accelerator pedal of a motor vehicle for movement of said latter valve towards an open position by depression of said pedal by the vehicle operator to provide said second source of fluid under pressure that varies as a function of the torque demand on said engine.

14. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radically move said rolling element and effect a change in the drive ratio of said transmission, including, in combination, fluid pressure servo means associated with selected ones of said elements for clamping all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure regulating valve movable variably across said conduit means between positions opening and closing said conduit means to provide a modulated fluid under pressure in said conduit means, means biasing said valve to a non-regulating position, a second source of fluid under pressure varying from a minimum to a maximum as a function of the changes in torque demand on an engine, and means connecting the fluid from said second source to said regulating valve to act thereon and bias said valve towards an open conduit means fluid regulating position with a force varying in proportion to the pressure of said second source fluid.

15. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radially move said rolling element and effect a change in the drive ratio of said transmission, including, in combination, fluid pressure servo means associated with selected ones of said elements for effecting a clamping of all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure control valve movable variably across said conduit means between positions opening and closing said conduit means to provide a modulated fluid under pressure in said conduit means, first means biasing said valve to a non-regulating position, other biasing means biasing said valve towards an open conduit means fluid regulating position, said control means also including another source of fluid varying in pressure as a function of the changes in speed of an engine operably drive connected to one of said races, and means connecting the fluid from said another source to said valve to act thereon in opposition to said other biasing means to bias said valve towards a closed conduit means position whereby the fluid pressure in said conduit means beyond said valve is modulated as a function of the differential in forces effected by changes in engine speed.

16. A control circuit as in claim 15, including other conduit means at times operably connecting said first named source of fluid to said control valve to act thereon and urge said latter valve towards an open conduit means position in opposition to the fluid acting on said latter valve from said another source.

17. A control circuit as in claim 15, said other biasing means including a second source of fluid under pressure varying from a minimum to a maximum as a function of the changes in torque demand on an engine, and means connecting the fluid from said second source to said control valve to act thereon and bias said valve towards an open conduit means fluid regulating position with a force varying in proportion to the pressure of said second source fluid.

18. A control circuit as in claim 17, wherein said second source of fluid includes a regulating valve in a branch of said conduit means and variably movable across said branch conduit means from a position closing it to a position opening it, and means responsive to the torque demand on said engine for moving said latter valve.

19. In a control circuit for a ball drive transmission having a pair of radially space races at least one of which is rotatable relative to the other of said races, said races frictionlly engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, and first and second valve means in said conduit means for variably regulating the communication of fluid under pressure from said source to said ratio change and clamping servo means, respectively, to effect changes therein, means for moving said first valve means to change the drive ratio servo means pressure, and other valve means connected to said source and movable by the differential between the ratio change and clamping fluid pressures acting thereon to provide a regulated fluid pressure acting on said second valve means for moving said second valve means to admit fluid from said source to said second servo means, whereby the movement of said first valve means effects a change in the clamping pressure that varies in inverse proportion to the change in the drive ratio change pressure.

20. A control circuit as in claim 19, wherein said first and second valves comprise fluid pressure regulating valves being variably movable between conduit means opening and closing positions and movable across portions of the conduit means leading, respectively, to the ratio change and clamping servo means for providing different modulated fluid pressures to said servo means, said other valve means comprising a third regulating valve having spaced differential areas connected to and acted upon respectively in opposite directions of the modulated fluid under pressure from said first and second regulating valves, the fluid under pressure from said first valve acting upon the larger of said areas and moving said third valve towards a non-regulating position, the regulated fluid under pressure from said third valve acting upon and biasing said second valve towards a regulating position increasing the fluid pressure to said clamping servo means.

21. A control circuit as in claim 20, including a drive member operably connected to one of said races, a second source of fluid under pressure varying as a function of the changes in speed of said drive member, means connecting the fluid from said second source to said second valve to act thereon in opposition to the regulated fluid under pressure from said third valve whereby the clamping servo means fluid pressure varies as a function of the changes in drive member speed and the changes in the fluid pressure in the ratio change servo means.

22. A control circuit as in claim 20, including an engine driven shaft operably driving one of said races, and a second source of fluid under pressure varying as a function of the changes in torque output of the engine driving said one race and acting on said second valve in opposition to the fluid under pressure from said third valve to move said second valve towards a position increasing the clamping servo means pressure, whereby said second valve modulated pressure varies as a function of the torque output of the engine and the change in drive ratio servo means pressure.

23. A control circuit as in claim 22, wherein said second source includes a fourth fluid regulating valve movable across a branch line from said first named source to modulate the flow therefrom between a minimum and maximum pressure, means connecting said modulated fluid under pressure to said second regulating valve to act thereon and aid said engine torque output varying fluid pressure, said fourth valve being biased to a position providing a maximum fluid pressure to said second valve, means operably connecting the intake manifold vacuum of the engine to act on said fourth valve in a direction moving said valve towards a position providing a minimum fluid pressure acting against said second valve, whereby said second valve modulated fluid pressure to said clamping servo means is controlled as a function of the changes in ball drive ratio servo means fluid pressure and engine torque output as indicated by changes in intake manifold vacuum.

24. A control circuit as in claim 23, including a third source of fluid under pressure varying as a function of the changes in speed of said engine, means connecting the fluid from said third source to said second valve to act thereon in opposition to the regulated fluid under pressure from said third valve whereby the clamping servo means fluid pressure varies as a function of the changes in engine torque output and engine speed and the changes in ratio change servo means fluid pressure.

25. A control circuit as in claim 24, wherein said third source comprises an engine driven fluid pressure governor.

26. In a control circuit for a ball drive transmission having a pair of radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second means associated with the other of said races for clamping said elements together and transmitting a drive through said transmission, a source of fluid under pressure, conduit means connecting said source to each of said servo means, first and second fluid pressure regulating valves connected to said source and movable between closed and open positions for developing first and second fluids under pressure varying from a minimum to a maximum, means connecting said first and second fluids to said ratio change and clamping servo means, respectively, means for moving said second valve towards one position in response to movement of said first valve towards the other position to provide changes in the pressure of said fluids in inverse proportion to each other, a source of changing fluid pressure indicative of changes in input torque to the ball drive, and means connecting said latter source and said second valve for moving said second valve to change said clamping pressures as a function of the change in input torque.

27. In a control circuit for a ball drive transmission having a pair of radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, first and second fluid pressure regulating valves connected to said source and movable between closed and open positions for developing first and second fluids under pressure varying from a minimum to a maximum, means connecting said first and second fluids to said ratio change and clamping servo means, respectively, means for moving said second valve towards one position in response to movement of said first valve towards the other position to provide changes in the pressure of said fluids in inverse proportion to each other, a source of changing fluid pressure indicative of changes in input speed to the ball drive, and means connecting said latter source and said second valve for moving said second valve to change said clamping pressures as a function of the change in input speed.

28. In a control circuit for an engine driven ball drive transmission having a pair of radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, first and second fluid pressure regulating valves connected to said source and movable between closed and open positions for developing first and second fluids under pressure varying from a minimum to a maximum, means connecting said first and second fluids to said ratio change and change and clamping pressure servo means, respectively, means for moving said second valve towards one position upon movement of said first valve towards the other position to provide changes in the pressure of said fluids in inverse proportion to each other, a varying source of engine intake manifold vacuum, and means operably connecting said vacuum and said second valve for effecting a movement of said second valve to change said clamping pressure in response to changes in said vacuum.

29. In a control circuit for an engine driven ball drive transmission having a pair of radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, first and second fluid pressure regulating valves connected to said source and movable between closed and open positions for developing first and second fluids under pressure varying from a minimum to a maximum, means connecting said first and second fluids to said ratio change and clamping pressure servo means, respectively, means for moving said second valve towards one position upon movement of said first valve towards the other position to provide changes in the pressure of said fluids in inverse proportion to each other, a varying source of engine intake manifold vacuum, and other valve means connected to said first named source and movable in response to changes in said vacuum for delivering a metered variable fluid pressure to said second valve for moving it to change said fluid clamping pressures as a function of the change in engine intake manifold vacuum.

30. In a control circuit for an engine driven ball drive transmission having a pair of radially spaced races at least one of which is rotatable relative to the other of said races, said races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting said source to each of said servo means, first and second fluid pressure regulating valves connected to said source and movable between closed and open positions for developing first and second fluids under pressure varying from a minimum to a maximum, conduit means connecting said first and second fluids to said ratio change and clamping pressure servo means, respectively, means for moving said second valve towards one position upon movement of said first valve towards the other position to provide changes in the pressure of said fluids in inverse proportion to each other, a source of varying fluid under pressure indicative of changes in engine torque demand, means connecting said first named source to said first valve for moving said first valve and changing said drive ratio in response to changes in engine torque demand, engine speed governor means providing a source of fluid under pressure that varies with changes in engine speed, means connecting said governor fluid pressure to said first and second valves to act thereon and move them to opposite positions.

31. In a control circuit for an engine driven ball drive transmission having a pair of radially spaced relatively rotatable races frictionally engaging radially adjustable balls therebetween, each of said races having axially spaced and connected elements slidable towards or away from each other to move said balls and effect changes in the drive ratio of said transmission, first fluid pressure servo means for moving the portions of one race to effect a change in drive ratio, second servo means associated with the other of said races for clamping said elements together and transmitting a drive through said transmission, a source of fluid under pressure, conduit means connecting the fluid from said source to each of said servo means, first and second fluid pressure regulating valves movable variably across said conduit means between closed and open positions for developing first and second fluids under pressure varying from a minimum to a maximum, conduit means connecting said first and second fluids to said ratio change and clamping pressure servo means, respectively, means for moving said second valve towards one position upon movement of said first valve towards the other position to provide changes in the pressure of said fluids in inverse proportion to each other, a second source of varying fluid under pressure indicative of changes in engine torque demand, means connecting the fluid from said first named source to said first valve for moving said first valve and changing said drive ratio in response to changes in engine torque demand, engine speed governor means providing a source of fluid under pressure that varies with changes in engine speed, means connecting said governor fluid pressure to said first and second valves to act thereon and move them towards closed and open positions, respectievly, a further source of fluid under a pressure changing in response to changes in the vacuum in an engine intake manifold, said second valve being movable in response to the pressure of the fluid from said further source thereagainst to modulate the clamping pressure forces also as a function of the change in intake manifold vacuum.

32. A control circuit as in claim 31, said means for moving said second valve upon movement of said first valve comprising a third regulating valve having spaced differential areas connected to and acted upon in opposite directions respectively by the modulated fluid under pressure from said first and second regulating valves, the fluid under pressure from said first valve acting upon the larger of said areas and moving said third valve towards a non-regulating position, the regulated fluid under pressure from said third valve acting upon and biasing said second valve towards a regulating position increasing the fluid pressure to said clamping servo means.

33. A control circuit as in claim 31, including a fluid bypass conduit connected to said first named source and associated with the first fluid conduit means and bypassing said first regulating valve thereby connecting said first named fluid source directly to said drive ratio servo means, and idle speed valve means extending across both said bypass portion and said first fluid conduit means for controlling the flow of fluid therethrough and being movable from a first position permitting flow through both said first fluid and bypass conduit means towards a second position blocking said bypass conduit means, means biasing said idle speed valve means to its first position, and means connecting the fluid from said engine speed governor source to said idle speed valve means to act thereon in a direction moving it towards its second position with a force varying as a function of the changes in engine speed.

34. A control circuit as in claim 33, said means for moving said second valve upon movement of said first valve comprising a third regulating valve having spaced differential areas connected to and acted upon in opposite directions respectively by the modulated fluid under pressure from said first and second regulating valves, the fluid under pressure from said first valve acting upon the larger of said areas and moving said third valve towards a non-regulating position, the regulated fluid under pressure from said third valve acting upon and biasing said second valve towards a regulating position increasing the fluid pressure to said clamping servo means.

35. A control circuit for a friction drive transmission having a pair of radially spaced races at least one of which is rotatable relating to the other, said races enclosing a radially adjustable rolling element frictionally engage therebetween, each of said races having axially spaced and connected elements slidable towards or away from each other to radially move said rolling element and effect a change in the drive ratio of said transmission, including, in combination, fluid pressure servo means associated with selected ones of said elements for effecting a clamping of all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure control valve movable variably across said conduit means between positions opening and closing said conduit means to provide a modulated fluid under pressure in said conduit means, and means to move said valve, said conduit means also including a fluid bypass portion bypassing said control valve thereby connecting the fluid from said source directly to one of said servo means, and valve means extending across both said bypass portion and a second portion of said conduit means that contains fluid modulate by said control valve for controlling the flow of fluid therethrough, said latter valve means being movable from a first position unblocking flow through both said second and bypass portions towards a second position blocking said bypass portion, means biasing said valve means to its first position, a speed responsive source of fluid under pressure, and means connecting the fluid from said latter source to said idle speed valve means to act thereon in a direction moving it towards its second position with a force varying as a function of the changes in speed of said latter source.

36. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radially move said rolling element and effect a change in the drive ratio of said transmission, including, in combination, fluid pressure servo means associated with selected ones of said elements for effecting a clamping of all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure control valve movable variably across said conduit means between positions opening and closing said conduit means to provide a modulated fluid under pressure in said conduit means, and means to move said valve, said conduit means also including a fluid bypass portion bypassing said control valve thereby connecting the fluid from said source directly to one of said servo means, and idle speed valve means extending across both said bypass portion and a second portion of said conduit means that contains fluid modulated by said control valve for controlling the flow of fluid therethrough, said idle speed valve means being movable from a first position unblocking flow through both said second and bypass portions towards a second position blocking said bypass portion, means biasing said idle speed valve means to its first position, an engine speed responsive source of fluid under pressure, and means connecting the fluid from said latter source to said idle speed valve means to act thereon in a direction moving it towards its second position with a force varying as a function of the changes in engine speed.

37. A control circuit as in claim 36, including other conduit means at times connecting said first named source of fluid to said valve means to act thereon and urge said valve means to its first position against the force of said speed responsive fluid pressure.

38. A control circuit as in claim 36, said means for moving said control valve including first means biasing said valve to a non-control position, other biasing means biasing said valve towards an open conduit means fluid regulating position, said engine speed responsive source comprising a source of fluid varying in pressure as a function of the changes in speed of an engine operably drive connected to one of said races, and means connecting the fluid from said latter source to said control valve to act thereon in opposition to said other biasing means to bias said control valve towards a closed conduit means position whereby the fluid pressure in said conduit means beyond said latter valve is modulated as a function of the differential in forces effected by changes in engine speed.

39. A control circuit as in claim 36, said means for moving said control valve including means biasing said valve to a non-control position, and other biasing means including a second source of fluid under pressure varying from a minimum to a maximum as a function of the changes in torque demand on an engine, and means connecting the fluid from said second source to said control valve to act thereon and bias said valve towards an open conduit means fluid regulating position with a force varying in proportion to the pressure of said second source fluid.

40. A control circuit as in claim 39, said engine speed responsive fluid source comprising a source of fluid varying in pressure as a function of the changes in speed of an engine operably drive connected to one of said races, and means connecting the fluid from said latter source to said control valve to act thereon in opposition to said second source fluid pressure and bias said valve towards a closed conduit means position whereby the fluid pressure in said conduit means beyond said valve is modulated as a function of the differential in fluid forces effected by changes in engine speed and engine torque demand.

41. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radially move said rolling element and effect change in the drive ratio of said transmission, including, in combination, fluid pressure servo means associated with selected ones of said elements for effecting a clamping of all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure regulating valve movable variably across said conduit means between positions opening and closing said conduit means to provide a modulated fluid under pressure in said conduit means, and means to move said valve, said conduit means also including a fluid bypass portion bypassing said regulating valve thereby connecting the fluid from said source directly to one of said servo means, and valve means extending across both said bypass portion and a second portion of said conduit means that contains fluid modulated by said regulator valve for controlling the flow of fluid therethrough, said valve means being movable from a first position unblocking flow through both said second and bypass portions towards a second position blocking said bypass portion, means biasing said valve means to its first position, and fluid pressure means acting on said valve means urging it towards its second position.

42. A control circuit as in claim 41, including other conduit means at times connecting said source of fluid to said valve means to act thereon and urge said valve means towards its first position.

43. A control circuit for a friction drive transmission having a pair of radially spaced races at least one of which is rotatable relative to the other, said races enclosing a radially adjustable rolling element frictionally engaged therebetween, each of said races having axially spaced and connected elements slidable towards or away from each other to radially move said rolling element and effect a change in the drive ratio of said transmission, including, in combination, fluid pressure servo means associated with selected ones of said elements for effecting a clamping of all of said elements together for transmitting a drive through said transmission, a source of fluid under pressure, conduit means connecting said source and said servo means, and fluid pressure control means in said conduit means movable to vary the level of the fluid pressure directed to said servo means, said control means including a fluid pressure regulating valve movable variably across said conduit means between positions opening and closing said conduit means to provide a modulated fluid under pressure in said conduit means, first means biasing said valve to a non-regulating position, a second source of fluid varying in pressure, means connecting the fluid from said second source to said valve to act thereon to bias said valve towards a closed conduit means position, and other conduit means at times operably connecting said first named source of fluid to said regulating valve to act thereon and urge said latter valve towards an open conduit means position in opposition to the fluid acting on said latter valve from said second source, whereby the fluid pressure in said conduit means beyond said valve is controlled as a function of the differential pressure forces between the fluids from said first named and second source.

References Cited by the Examiner

UNITED STATES PATENTS

| | | | |
|---|---|---|---|
| 2,701,970 | 2/1955 | Kraus | 74—200 |
| 2,941,422 | 6/1960 | Barish | 74—796 |
| 2,958,234 | 11/1960 | Oehrli | 74—796 X |

DAVID J. WILLIAMOWSKY, *Primary Examiner.*

L. H. GERIN, *Assistant Examiner.*